United States Patent [19]

Berz

[11] 4,353,722

[45] Oct. 12, 1982

[54] GRANULAR BED FILTER DEVICE INCLUDING A REGENERATIVE GRANULAR BED CLEANING APPARATUS

[75] Inventor: Wolfgang Berz, Westmount, Canada

[73] Assignee: Gimag Aktiengesellschaft, Switzerland

[21] Appl. No.: 136,613

[22] Filed: Apr. 2, 1980

[30] Foreign Application Priority Data

Apr. 3, 1979 [CH] Switzerland .......................... 3092/79
May 29, 1979 [CH] Switzerland .......................... 5007/79

[51] Int. Cl.³ ............................................. B01D 46/30
[52] U.S. Cl. ...................................... 55/294; 55/474; 55/488; 55/96; 55/98
[58] Field of Search .................. 55/293, 294, 302, 474, 55/488, 515, 517, 518, 96, 98

[56] References Cited

U.S. PATENT DOCUMENTS

| | | | |
|---|---|---|---|
| 1,498,061 | 6/1924 | Adams | 55/294 |
| 3,296,775 | 1/1967 | Squires | 55/96 |
| 3,912,466 | 10/1975 | Zenz | 55/96 |
| 3,922,152 | 11/1975 | Kookoothakis | 55/488 |
| 3,926,587 | 12/1975 | Squires | 55/302 |
| 4,004,350 | 1/1977 | Squires | 55/96 |
| 4,210,427 | 7/1980 | Brett et al. | 55/294 |

FOREIGN PATENT DOCUMENTS

| | | | |
|---|---|---|---|
| 1944438 | 4/1970 | Fed. Rep. of Germany | 55/294 |
| 2712102 | 9/1978 | Fed. Rep. of Germany | 55/96 |
| 871508 | 4/1942 | France | 55/517 |
| 2429035 | 2/1980 | France | 55/294 |
| 498017 | 3/1976 | U.S.S.R. | 55/294 |
| 585858 | 1/1978 | U.S.S.R. | 55/474 |
| 649447 | 3/1979 | U.S.S.R. | 55/294 |

Primary Examiner—David L. Lacey
Attorney, Agent, or Firm—Neil F. Markva

[57] ABSTRACT

A granular bed filter device comprising two gas-permeable walls bounding an annular filter bed disposed in a housing. The walls extend downwardly in a taper together and are inclined upwardly toward the central axis of the filter bed. A nozzle tube projects from above into the housing and has nozzles which are directed against the inner wall of the filter bed. In order to regenerate the dust-laden filter bed, compressed air is blown intermittently through the nozzle tube while at the same time the nozzle tube is set in motion by a motor. The accumulations of dust contained in the filter bed are ejected in agglomerated form through the outer wall and fall down into the region of a discharging conveyor.

14 Claims, 6 Drawing Figures

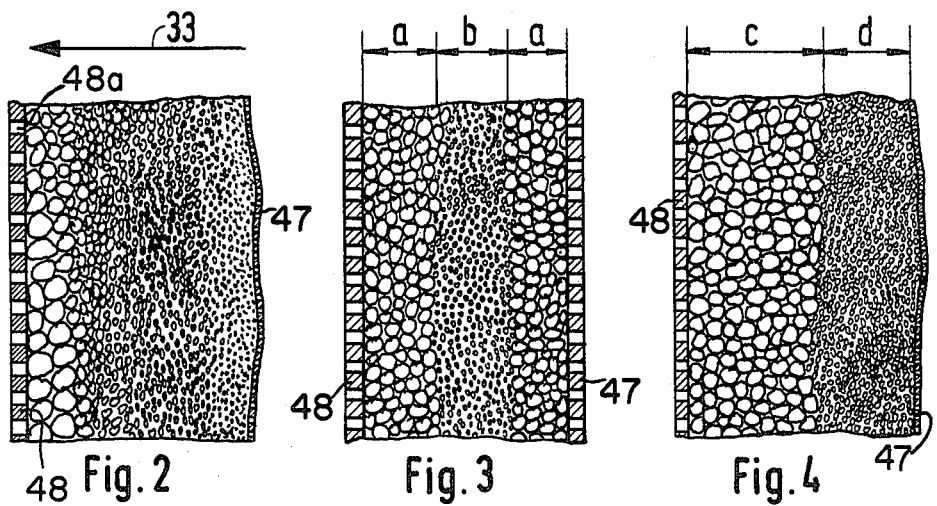
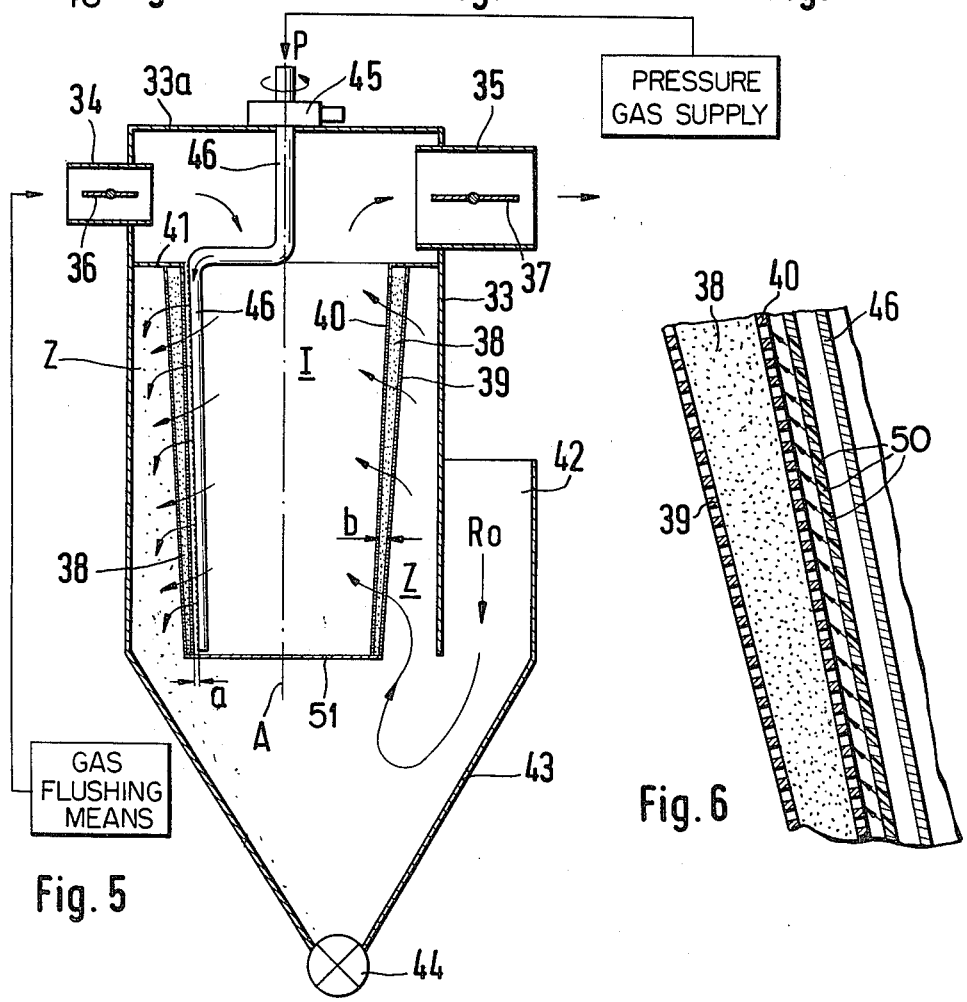

GRANULAR BED FILTER DEVICE INCLUDING A REGENERATIVE GRANULAR BED CLEANING APPARATUS

FIELD OF INVENTION

The invention relates to an apparatus for the regenerative cleaning of a filter bed consisting of granular material which is disposed inside a gas-tight housing between two walls which are gas permeable over a large proportion of their total area. The granular material projects upwards above the gas-permeable walls, into a bed expansion region which is bounded by wall sections which are impermeable to gas, and the ratio (H/B) of the height to the width of the filter bed is greater than 1.

BACKGROUND OF INVENTION

It is known by German patent application No. OS 2 257 247, to provide flushing-back nozzles which are acted upon by compressed air at the bottom of a filter apparatus. The flushing back is effected by means of two surges of compressed air which follow briefly one on the other, and the second of which is intended to release a shock wave before the filter bed settles.
With this known flushing back operation, the supply of raw gas is not stopped during the regenerating operation. Consequently, the stream of raw gas is merely dammed up during the flushing back operation. Then, the raw gas follows immediately on after the flushing back operation is completed and entrains the loosened dust back into the filter chamber.
Thus, a satisfactory regeneration of the filter material is not possible. The German patent application No. OS 27 45 966 shows a filter device wherein a layer of a filter material is disposed on a gas-permeable horizontal supporting surface. The thickness of the layer of this filter material amounts to a fraction of the horizontal dimension of the supporting surface. The ratio between the height of the filter bed and the basic surface carrying the filter bed is here necessarily always less than 1 because otherwise a vertical admission of raw gas would not be possible. Because of this unfavorable ratio, the filter bed has inadequate stability so that, after the cleaning, the filter bed settles in an irregular thickness, which must lead to openings and hence to severe operational disturbances of the filter.

An apparatus for cleaning gases is known by German patent application No. OS 27 50 381 wherein the granular filter material is contained between two vertically disposed, parallel metal-wire screen nettings. The screen nettings are constructed in the form of concentric cylinders and are flowed through by the raw gas from the outside inwards. A nozzle tube which is charged with a high-pressure gas and which is intended to blow through the filter bed from time to time and free it of adhering dust, can be installed in the cylinder axis in the inner space bounded by the screen cylinder. Thus, here, the cleaning of the filling consisting of granular material is effected by briefly blowing in compressed air into the clean gas compartment, counter to the flow of gas effected during normal filter operation.

Such a cleaning system has been in use successfully for years in textile filters. During the operation of filters with a granular layer in this form, the unwanted brief reversal of the flow of gas only occurs incompletely so that considerable amounts of loosened dust enter the clean gas. With such filters the clean-gas dust contents required today and in future are exceeded considerably when using the shock operation during the cleaning.

Among other things, the known device has the disadvantage that the spacing between the nozzles and the filter bed is necessarily large. Thus, the jets of compressed air directed toward the filter bed remain very ineffective. The effect of the compressed air naturally decreases very greatly with the distance, as a result of which only small tube diameters up to about 300 mm can be adequately cleaned, while today filters with a diameter of 1000 mm and more are used.

In addition, it has been found that, with such a known device, the filter bed has to be regenerated relatively often and that the constant thickness of the circular filter bed does not represent an optimum solution, bearing in mind the flow of raw gas.

Also the extent of filling (thickness of the filter bed) is too great and unsuitable for the cleaning with compressed air, which leads to frequent disturbances and blockages.

Furthermore, it is a fact known to those skilled in the art, that when compressed air is used for the regenerative cleaning of the filter material, the thickness of the latter plays an important part because the compressed air blown freely out of a nozzle can only penetrate through and swirl up or set in vibration relatively thin layers. The realization of a thin filtration layer, with the same filtering action, means, however, the use of small grain sizes so that the gas-permeable walls enclosing the filter material must likewise be made with fine pores. This fact works to the disadvantage of the stability of the screen netting containing the filter material which is not stable enough with a fine-pored construction.

SUMMARY OF THE INVENTION

The primary object of the invention is to provide an apparatus for the regenerative cleaning of a filter bed which ensures an intensive periodic regeneration of the filter material, with simultaneous loosening of the granular filter material and removal of the loosened particles of dust. The new apparatus should also achieve an optimum filtering efficiency despite a relatively thin thickness of the layer of the filter bed and has a stable construction of the surrounding screen netting.

As described herein, the apparatus of this invention includes the use of a tube means connected to a source of pressure gas and projecting into a region adjacent to and surrounded by the walls defining a filter bed. This tube means is used for the regenerative cleaning of the filter bed. The two laterally spaced walls hold the granular material of the filter bed. The particle porosity of the walls is effective to allow passage of dust particles entrained in the gas being cleaned but sufficient to maintain the granular material of the filter bed in place during the raw gas cleaning process and the regenerative cleaning process. The invention is particularly limited to a vertically disposed bed wherein the ratio of the height to the width of the filter bed (H/B) is greater than 1. The tube means includes a plurality of outlet nozzles for directing pressure gas such as compressed air through the spaced walls and filter bed.

BRIEF DESCRIPTION OF DRAWINGS

Other objects of this invention will appear in the following description and appended claims, reference being made to the accompanying drawings forming a part of the specification wherein like reference characters designate corresponding parts in the several views.

FIGS. 2 to 4 illustrate the distribution of grain sizes in the filter bed with reference to a vertical section, FIG. 5 shows, in vertical section, another modification, wherein the left-hand half of the Figure shows the regenerating phase and the right-hand half thereof the raw-gas cleaning phase and FIG. 6 shows a modified construction with reference to a detail.

DETAILED DESCRIPTION

Figure 1:
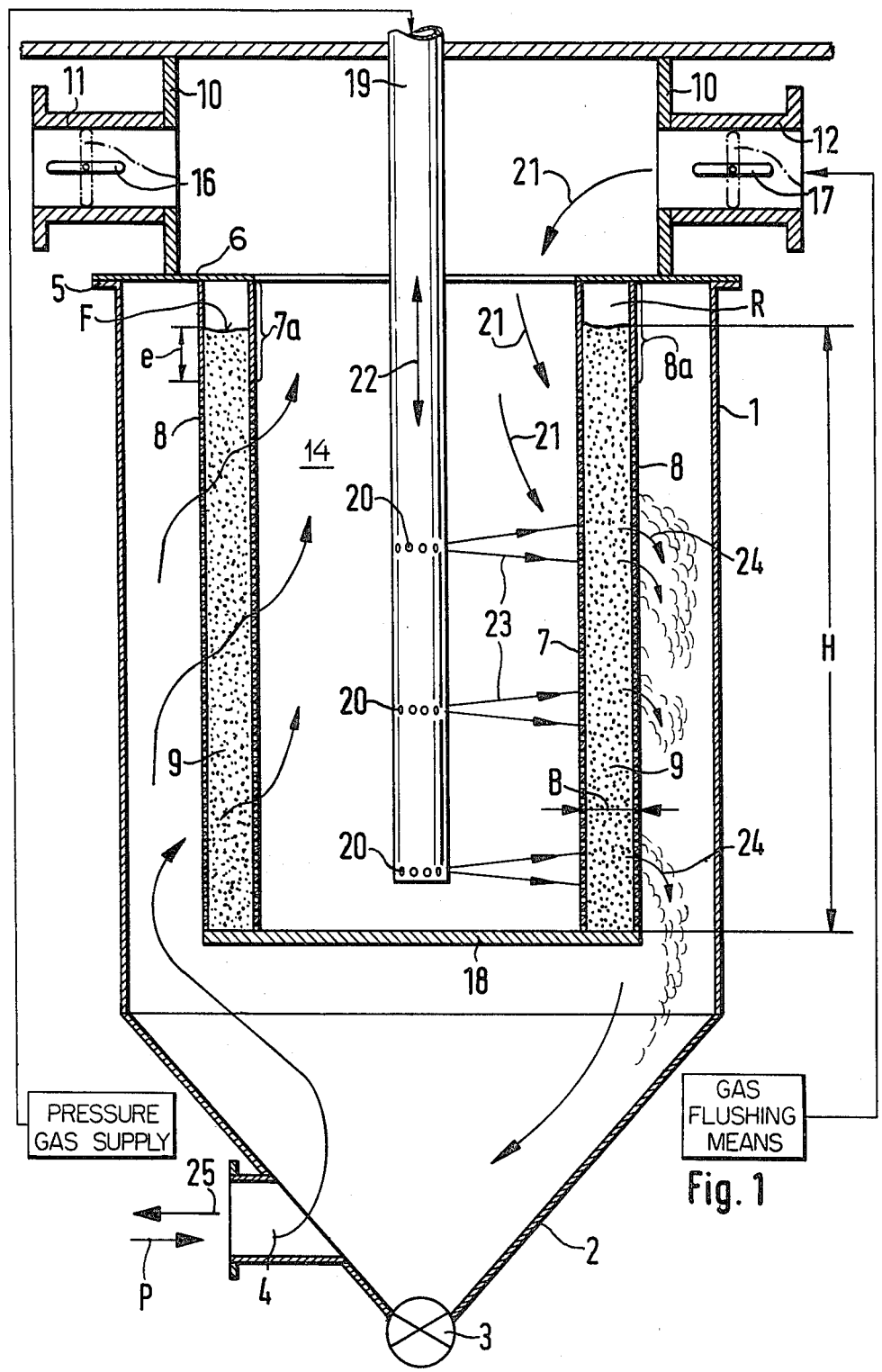
FIG. 1 is a simplified vertical section through a filter unit for cleaning a dust-laden raw gas, the left-hand half illustrating the raw-gas cleaning operation and the right-hand half the regenerating phase.

The filter unit illustrated in FIG. 1 comprises a housing 1 which may have a circular or square cross-section and includes a collecting funnel 2. An air shut-off and discharge member 3 is disposed at the lowest point of collecting funnel 2 and a raw-gas inlet socket 4 leads into the side wall of collecting funnel 2. Resting on the upper, horizontal flange 5 of the housing 1 is a horizontal wall 6 on which two gas-permeable walls 7 and 8 are suspended. Walls 7 and 8 may consist of a wire netting material.

The upper sections 7a and 8a of walls 7 and 8, respectively, are impermeable to gas. Sections 7a and 8a extend from below the upper edge F of filter bed 9 to upper horizontal wall 6. Dimension e, by which filter bed 9 projects above the upper end of the gas-permeable walls, should correspond at least to the width B of the filter bed. Sections 7a and 8a which are impermeable to gas ensure that the raw gas has to take the path through filter bed 9. Thus, above upper edge F of filter bed 9, wall sections 7a and 8a surround an expansion chamber R which serves to equalize the filter material.

The two practically circular cylindrical gas permeable walls 7 and 8 are concentrically spaced to form an annular chamber. A granular filter material fills up the chamber up to the height of the expansion chamber R. This filter material may be, for example, quartz sand a corresponding plastics granulate or the like. The numerous gas passages disposed in the two gas-permeable walls 7 and 8 are adapted, in their dimensions, to the grain size of the filter material so that this cannot leave the gap between the two walls 7 and 8. In other words, walls 7 and 8 have a particle porosity effective to allow passage of dust particles entrained in the gas being cleaned but sufficient to maintain the granular material of filter bed 9 in place.

A clean gas outlet passage 11 and a flushing gas inlet passage 12 are inserted in an annular wall 10. Disposed inside the flushing-gas inlet passage 12 is a regulating valve 17 and inside the clean gas outlet passage a regulating valve 16. When the regulating valve 16 is open (raw gas cleaning), the regulating valve 17 is closed. During the regenerating phase, which is illustrated in the right-hand half of FIG. 1, the regulating valve 17 is open and the regulating valve 16 is closed.

A compressed-air supply pipe 19 projects from above into compartment 14 surrounded by the two gas-permeable walls 7 and 8. Disc 18 closes the bottom of compartment 14 in a gas-tight manner. Pipe 19 includes a row of nozzles or outlets 20 in each of three different planes.

In the operating phase (left-hand half of FIG. 1, raw gas cleaning phase), raw gas enters housing 1 in direction of arrow P through the socket 4, traverses filter bed 9 from outside inwards and leaves the filter unit through outlet passage 11. In this case valve 16 is open, valve 17 is closed.

As raw gas flows through filter bed 9, the dust entrained by the raw gas is deposited in the interstices between the individual grains of the filter bed 9. After a certain operating period, filter bed 9 is soiled to such an extent that its flow resistance becomes inadmissibly high and the efficiency of the filter drops. Then it is necessary to regenerate the filter bed by freeing it of adhering particles of dust. The directiion of flow of the gas and the position of the regulating valve 17 for the regenerating phase are illustated in the right-hand half of FIG. 1.

To regenerate filter bed 9, regulating valves 16 and 17 are first actuated so that they close clean gas outlet passage 11 and open flushing gas inlet passage 12, respectively. Thus, the flushing gas enters housing 1 in the direction of the arrow 21, traverses filter bed 9 from the inside outwards and leaves housing 1 through socket 4. It has been found that the fine particles of dust tend to accumulate in front of and behind the particles of the filter material i.e. they lay to some extent in the shadow of the flow of flushing gas and are not caught by the flushing gas. Consequently this type of regeneration is not sufficient.

According to the present invention, therefore, in addition to the regeneration by means of flushing gas, tube 19 is acted upon in the regenerating phase with compressed air under a pressure of 8 bar for example, and is moved up and down at short intervals of time in the direction of the double arrow 22. The compressed-air outlets 20 widen out in a taper from the inside outwards forming a circular jet 23 of compressed air which impinges with great force on inner wall 7, penetrates through filter bed 9 and entrains particles of dust. The relatively high pressure of the emerging compressed air and the impulse-like action mechanically move the grains of filter bed 9. Thus, the grains are displaced in relation to one another or set in vibration so that the intervening particles of dust can be caught and entrained by the jets of compressed air and the stream of flushing gas. The dust falls downwards in the direction of the arrow 24 and is largely removed by the conveyor or discharge member 3. A small proportion of dust is entrained by the combined stream of flushing gas and compressed air and flows in the direction of the arrow 25 through socket 4 and mixes with the raw gas.

During the regenerating phase, tube 19 is preferably moved up and down by a device working automatically, so that the inner face of wall 7 is repeatedly acted upon completely with compressed air. The construction of this apparatus, which may comprise a hydraulically actuated piston for example, is known to one skilled in the art and is therefore not described in detail. Furthermore, tube 19 can be set in rotation.

The desired movement, swirling up and removal of dust from filter bed 9 by the jets of compressed air 23 can be impaired if filter bed 9 is too thick to achieve a satisfactory degree of dust removal, bearing in mind the grain size. With small grain sizes in filter bed 9, thin, fine-pored screen nettings generally have to be used. Thus walls 7 and 8 are not stable enough under the conditions. According to the present invention grain sizes are arranged within filter bed 9 as shown in FIGS. 2 to 4, in concentric, practically circular cylindrical layers a to d. With the form of embodiment shown in FIG. 2, the more stable wall 48 situated at the outflow side of the raw gas is provided with relatively large openings 48a and the coarsest grain is adjacent to this wall, while the finest grain is adjacent to the fine-pored wall 47. Thus the grain size of bed 9 increases successively in the direction of the arrow 33.

The embodiment shown in FIG. 3 includes two gas-permeable walls 47 and 48 which are made equally thick and have gas passages of equal size. Adjacent to each of these walls is a layer of filter material a with large grain, and between these two outer layers a central layer b of smaller grain size is disposed.

Another modification illustrated in FIG. 4 shows two gas-permeable walls 47 and 48 corresponding to the form of embodiment in FIG. 2; in contrast to the latter, however, are two distinctly different layers c and d of filter material. The material layer c of coarser grain lies against the stronger wall 48, at the outflow side of the raw gas, while the finer grain bears against the small-pored wall 47.

The division of the filter bed 9 into the different layers illustrated by way of example in FIGS. 2 to 4, makes it possible to achieve an excellent degree of filter action and to construct stable filter elements. When filling the various layers, concentric, circular cylindrical plates may be used between walls 47 and 48 with the various ranges of grain size being fed therein. When a distinction is made between the "ranges of grain size" a, b, c and d, in this connection, it is meant that the granular material of one and the same range of grain sizes has substantially the same grain size, but certain deviations in practice are, of course, unavoidable.

The forms of embodiment described can be modified in many ways by one skilled in the art. Thus, walls 7 and 8 of FIG. 1 may also be in the form of plates disposed in vertical planes.

The ratio (H/B) of the height H (FIG. 1) of the filter bed 9 to its width B is at least equal to 1 in all possible modifications of the invention. In the preferred forms of embodiment, H is a multiple, for example, ten times, B.

FIG. 5 shows a practically circular cylindrical, gas-tight housing 33 having a flushing-gas socket 34 and a clean-gas socket 35 leading into its upper portion. A valve 36 in flushing gas socket 34 and a valve 37 in the clean gas socket 35 are used to control gas flow as described below.

Gas-tight housing 33 contains a filter bed 38 which is surrounded by two gas-permeable walls 39 and 40. In the upper part, the two gas-permeable walls 39 and 40 lead into two annular sections which are impermeable to gas and which correspond to the sections 7a/8a of FIG. 1 and are not illustrated. The granular material of the filter bed 38 extends in the gap between the two walls 39 and 40 into the region of the two sections which are impermeable to gas.

The two walls 39 and 40 which are permeable to gas and which may be constructed of metal wire netting are securely fixed to an annular top 41 and circular bottom 51. The chamber I surrounded by the filter bed 38 is closed in a gas-tight manner by the bottom 41. Outside the housing 33, a raw gas passage 42 directs the dust-laden raw gas to be cleaned into the filter unit. The raw gas passage 42 leads into a lower housing portion 43. A worm conveyor 44 is disposed at the lowest point of the funnel-shaped housing portion 43.

A drive unit 45 disposed on the horizontal upper covering plate 33a of the housing 33 rotatably drives a nozzle tube 46 projecting into the housing 33. Nozzle tube 46 penetrates through drive unit 45 and is taken, inside this unit 45, through one of the driven gearwheels and is rigidly connected to this for rotation therewith. As FIG. 5 further shows, nozzle tube 46 at first extends in the axis of the housing 33 and then, after a double bend of about 90°, follows the inner gas-permeable wall 40. Nozzle tube 46 has small outlet nozzles over its whole height adjacent to the wall 40.

As shown in FIG. 5, the two gas-permeable walls 39 and 40 are inclined in a taper with respect to their common axis A. Thus, the annular chamber through which the raw gas flows in this form of embodiment, decreases continuously upwards, whereas the outflow chamber of the clean gas, designated by I increases continuously upwards.

It would also be possible to reverse the conical inclination of the filter bed 38 so that the cone formed by the filter bed became narrower not downwards (as in FIG. 5) but upwards. In this case, the raw gas Ro would have to be introduced from below in the chamber I and flow through the filter bed from the inside outwards.

It can further be seen from FIG. 5 that the thickness b of the filter bed defined by the mutual spacing of gas-permeable walls 39 and 40, increases continuously from the bottom upwards. In one form the filter bed has a thickness of 30 mm at its lowest point which widens out to about 35 mm in the upper section.

In operation, the dust-laden raw gas Ro to be cleaned flows, according to FIG. 5 (right-hand-half) through the raw gas passage 42 from below into the annular chamber Z and flows through the filter bed 38 from the outside inwards. The clean gas leaves housing 33 through clean gas connection 35.

After a certain operating time, which can be controlled depending on time or by the soiling of the filter through the reduced pressure, the clean gas valve 37 is closed to interrupt the supply of raw gas to the corresponding filter element. At the same time, flushing air valve 36 is opened and flushing air is conveyed through filter bed 38. In the left-hand half of FIG. 5, the stream of flushing air is indicated by arrows. Thus, a clear counter current develops in the granular filter bed 38. At the same time, the nozzle tube 46 is intermittently charged with compressed air. The jets of compressed air emerge from nozzles 50 of tube 46 and are directed against outer wall 40 to penetrate through the granular filter bed 38. The air jets move and rotate the individual grains of the filter bed according to the point of impact and entrain the adhering dust in its agglomerated form so that the dust emerges through outer wall 38, falls down because of its weight and is discharged by the worm conveyor 44. After cleaning, clean gas valve 37 is opened again and flushing gas valve 36 closed to resume the normal cleaning operation of the filter unit.

Thus, compressed air blown onto the filter bed 38 by nozzle tube 46 is used to clean the granular layer. Thanks to the short distance between the nozzle tube 46 and filter bed 38, an intensive cleaning of the latter takes place and the jets of compressed air exert a mechanical effect in the form of very small changes in position of the granular material. Consequently, the filter bed is completely free of dust after each cleaning so that the filter bed has the minimum flow resistance with the maximum possible separating capacity for the next operating phase.

The short distance of the emerging jets of compressed air from the filter layer to be cleaned makes it possible to reduce the diameter of the nozzles 50 considerably in comparison with the known arrangement of the central nozzle tube. This reduction in nozzle diameter leads to a great reduction in the amount of compressed air needed for each cleaning and hence to a great saving in energy.

The device made in accordance with the invention can naturally be varied in many ways by one skilled in the art.

In the embodiments of FIGS. 1 and 5, the supply stream of raw gas is interrupted during the regenerating phase and the filter bed is exposed both to a stream of flushing gas and to the action of an intermittent stream of compressed air during the regeneration. The purpose of the compressed air is to shake the filter bed mechanically and to loosen the adhering particles of dust while the removal of these particles of dust is effected by the continuous stream of flushing gas. It is, however, perfectly possible to work without flushing gas in that the loosening of the filter bed and the blowing out of the particles of dust by means of compressed air is effected during the raw-gas cleaning operation and so no interruption in operation is necessary.

Furthermore, the continuous increase in the thickness b of the filter bed has a special importance. The purified gas is, as is known, drawn off through the pure gas socket 35 disposed in the upper portion of housing 33. Thus, a greater reduced pressure prevails in the upper portion of housing 33 than at the bottom of the filter bed. With a parallel arrangement of the two gas-permeable walls 39 and 40, more gas would thus be drawn off in the upper portion which would lead to an irregular accumulation of dust in the filter bed.

The outlets for the compressed air are disposed practically horizontally in the wall of the tube 19 (FIG. 1), so that the emerging jets of compressed air 23 impinge horizontally on the inner gas-permeable wall 7. The main purpose of the jets of compressed air 23 is to move or rotate the grains of the filter bed mechanically and individually. Thus, it may be an advantage if the jets of compressed air 23 are directed obliquely upwards because the filter bed can yield in this direction.

FIG. 6 shows such a modification and represents an enlarged detail of FIG. 5. The outlets or nozzles 50 of the compressed air tube 46 are directed obliquely upwards, so that the compressed air emerges in the direction of the arrows. Under the effect of the jets of compressed air, the filter material, particularly with a relatively low specific weight, can escape into the upper free space or expansion zone within the filter material chamber. This facilitates the loosening or the movement of the filter material.

While a filter bed consisting of granular material and an apparatus for the regenerative cleaning thereof has been shown and described in detail, it is obvious that this invention is not to be considered as being limited to the exact form disclosed, and that changes in detail and construction may be made therein within the scope of the invention, without departing from the spirit thereof.

What I claim is:

1. A filter apparatus having regenerative filter cleaning means comprising:
   (a) a filter bed device including a granular filter bed vertically disposed between two laterally spaced walls located inside a gas-tight housing having a raw gas inlet and a clean gas outlet,
   (b) the two spaced walls are gas-permeable over a large part of their total area and the ratio (H/B) of the height to the width of the granular filter bed is greater than 1,
   (c) the granular filter bed projects upwardly, above the gas-permeable walls, into a bed expansion region defined by gas-impermeable wall sections, said filter bed being completely enclosed by the gas-permeable walls, and
   (d) the cleaning means including a tube connected to a source of pressure gas and is movably disposed outside the granular filter bed and adjacent said gas-permeable walls in the region of the filter bed,
   (e) said tube including a plurality of outlet nozzles for directing pressure gas through the spaced walls and filter bed to cause fluidization of the granular filter bed.

2. A filter apparatus having regenerative filter cleaning means comprising:
   (a) a gas-tight housing having a raw gas inlet and a lcean gas outlet and containing two laterally spaced, vertically disposed walls which hold a granular filter bed therebetween,
   (b) said two walls having a particle porosity effective to allow passage of dust particles entrained in the gas being cleaned but sufficient to maintain the granular material of the filter bed in place and being gas-permeable over a large portion of their total surface and gas-impermeable over a small portion of their total surface to form a bed expansion region above the filter bed,
   (c) said granular material of the filter bed projects upwardly above the gas-permeable walls to be completely enclosed by the gas-permeable walls to permit fluidizing of the granular material
   (d) the filter bed having a ratio (H/B) of the height to the width thereof greater than 1, and
   (e) the cleaning means including tube means connected to a source of pressure gas and projecting into a zone adjacent to and surrounded by the two walls defining the filter bed,
   (f) said tube means including a series of outlet nozzles for directing gas under pressure through the walls and granular filter bed to fluidize said granular filter bed causing it to expand into said bed expansion region wall sections during a regenerative cleaning of the granular filter bed.

3. An apparatus as defined in claim 2 further including
   valve means located at the gas inlet and gas outlet for interrupting the stream of raw gas at the raw gas inlet during a regenerating phase and
   for allowing a stream of flushing gas to move in a direction opposite to the direction of the gas cleaning direction while the granular filter bed is exposed to the action of compressed air through the outlet nozzles of the tube means.

4. An apparatus as defined in claim 2 wherein
   the tube means includes at least one pressure gas pipe mounted to move with respect to the two walls fixedly mounted within said housing,
   a drive unit connected to said at least one pressure gas pipe to effect movement of said at least one pressure gas pipe during the regenerative cleaning of said filter bed.

5. An apparatus as defined in claim 4 wherein
   said walls define an annular filter bed chamber defining an inner region and having an inner wall and an outer wall, said at least one pressure gas pipe includes a single tube having said outlet nozzles disposed along the length thereof within said inner region, and said at least one pressure gas pipe is mounted to reciprocate along its longitudinal axis to effect a sweeping motion of the pressurized gas against the inner wall of said filter bed housing.

6. An apparatus as defined in claim 5 wherein the outlet nozzles widen out in a taper from the inside of the at least one pipe to the outside of the at least one pipe to form a circular jet of compressed gas which impinges against the outer surface of the inner wall and penetrates through the filter bed to entrain particles of dust disposed within the granular filter material during the cleaning procedure.

7. An apparatus as defined in claim 4 wherein the two gas permeable walls are concentric, said at least one pressure-gas pipe is disposed eccentrically with respect to said two concentric gas-permeable walls, said at least one pressure-gas pipe is mounted to rotate about its vertical axis in the immediate vicinity of the two concentric gas-permeable walls at the clean gas inside.

8. An apparatus as defined in either claim 5 or claim 7 wherein the series of nozzles are disposed one above the other along the length of the at least one gas pressure pipe, the nozzles are directed obliquely upwardly with respect to the direction of their outlet against the outside surface of the filter bed containing wall.

9. An apparatus as defined in claim 2 wherein the granular filter bed includes a disposition of layers of granular materials having at least two different ranges of grain size.

said individual layers of differing grain sized granular material being disposed concentrically and contiguously with respect to each other, the outermost layer of granular material having the largest range of grain size adjacent to the gas-permeable wall.

10. An apparatus as defined in claim 9 wherein there are at least three different ranges of grain sizes of granular material in the filter bed, the inner wall having a smaller permeability than the outer wall, defining the filter bed therebetween, the smallest grain size being disposed against said inner wall to contact the inflow of raw gas through the filter bed.

11. An apparatus as defined in claim 9 wherein the two walls have a porosity that is substantially equal, the outer layers adjacent the gas-permeable walls within the filter bed have the larger range of grain size with a layer of smaller grain sized granular material being disposed therebetween.

12. An apparatus as defined in claim 10 wherein the two laterally spaced, vertically disposed walls are circular and concentric with respect to each other, an annular granular filter bed is contained between said two concentric gas-permeable walls and extends in a taper towards its vertical axis, said taper being effective to cause an inflow cross section to decrease continuously in the direction of flow of raw gas, said taper also being effective to cause the outflow cross section for the clean gas situated at the other side of the filter bed to increase continuously in the direction of the clean gas flow.

13. An apparatus as defined in claim 2 wherein the two gas-permeable walls are laterally spaced by an amount which determines the thickness of the filter bed and said amount increases continuously from the bottom of the filter bed upwardly.

14. A filter apparatus having regenerative filter cleaning means comprising:
 (a) a filter bed device including two vertically disposed, concentric walls laterally spaced with respect to each other with granular material being disposed between the concentric walls to form a granular bed,
 (b) said walls including a gas permeable portion and a gas non-permeable portion, said gas permeable portion having pores with a mesh size that is less than the smallest particle size of the granular filter material,
 (c) the gas non-permeable portion being located at the top of the concentric walls,
 (d) said gas non-permeable portion of the concentric walls defining a bed expansion region above the granular filter bed, and
 (e) the cleaning means including means disposed adjacent one of the walls opposite the filter bed to direct a cleaning gas through the spaced walls and the filter bed at a pressure sufficient to produce fluidization of the granular filter material and cause expansion of the filter bed into the bed expansion region.

* * * * *